(12) United States Patent
Oh et al.

(10) Patent No.: US 7,136,271 B2
(45) Date of Patent: Nov. 14, 2006

(54) STATIC CHARGE NEUTRALIZING ASSEMBLY FOR USE ON ROLLERS AND SHAFTS

(75) Inventors: Hieyoung W. Oh, Bowdoin, ME (US); Charles A. King, Falmouth, ME (US); Daniel P. McCormick, Turner, ME (US)

(73) Assignee: Illinois Tool Works Inc, Glenview, IL (US)

( * ) Notice: Subject to any disclaimer, the term of this patent is extended or adjusted under 35 U.S.C. 154(b) by 271 days.

(21) Appl. No.: 10/714,295

(22) Filed: Nov. 14, 2003

(65) Prior Publication Data

US 2004/0184215 A1    Sep. 23, 2004

Related U.S. Application Data

(60) Provisional application No. 60/455,301, filed on Mar. 17, 2003.

(51) Int. Cl.
H05F 3/00    (2006.01)
H01H 47/00    (2006.01)
H05F 3/02    (2006.01)

(52) U.S. Cl. .................. 361/221; 361/220; 361/222
(58) Field of Classification Search ............... 361/220, 361/221, 222
See application file for complete search history.

(56) References Cited

U.S. PATENT DOCUMENTS

| | | |
|---|---|---|
| 4,189,702 A | 2/1980 | Maloy |
| 4,307,432 A | 12/1981 | Nishikawa ............ 361/221 |
| 4,515,417 A | 5/1985 | Shiraishi ............. 384/445 |
| 4,801,270 A | 1/1989 | Scarlata |
| 5,010,441 A * | 4/1991 | Fox et al. ............ 361/221 |
| 5,085,373 A | 2/1992 | Behr et al. |
| 5,090,710 A | 2/1992 | Flower |
| 5,227,950 A | 7/1993 | Twerdochlib .......... 361/221 |
| 5,251,081 A | 10/1993 | Cossette et al. ....... 360/97.02 |
| 5,400,208 A | 3/1995 | Pazda et al. ......... 361/221 |
| 5,690,014 A | 11/1997 | Larkin |
| 6,315,475 B1 | 11/2001 | Carter et al. ......... 400/635 |
| 6,498,913 B1 * | 12/2002 | Tooker et al. ........ 399/90 |
| 6,686,673 B1 | 2/2004 | Komura et al. ........ 310/90 |
| 6,896,735 B1 | 5/2005 | Giuliano et al. |
| 6,909,868 B1 | 6/2005 | Yamada et al. |
| 2002/0121821 A1 | 9/2002 | Ritter |
| 2003/0030340 A1 | 2/2003 | Tashiro |
| 2004/0135016 A1 | 7/2004 | Baumann et al. |
| 2004/0184215 A1 | 9/2004 | Oh et al. |
| 2004/0233592 A1 | 11/2004 | Oh et al. |
| 2006/0007609 A1 | 1/2006 | Oh et al. |

FOREIGN PATENT DOCUMENTS

EP    0796663    8/2001

* cited by examiner

Primary Examiner—Brian Sircus
Assistant Examiner—Dharti H. Patel
(74) Attorney, Agent, or Firm—Paul F. Donovan; Mark W. Croll

(57) ABSTRACT

A static charge neutralizer for a moving component of an apparatus includes a plurality of filaments on a conductive strip, with tips of the filaments disposed adjacent but spaced from the moving component. The filaments induce ionization in the presence of an electrical field from the statically charged surface of the moving component.

19 Claims, 4 Drawing Sheets

STATIC CHARGE NEUTRALIZING ASSEMBLY FOR USE ON ROLLERS AND SHAFTS

CROSS-REFERENCE TO RELATED APPLICATIONS

The present regular application claims the benefit of U.S. Provisional Application Ser. No. 60/455,301, filed Mar. 17, 2003.

FIELD OF THE INVENTION

The present invention relates to static charge neutralizing devices used on rollers and shafts; and, more particularly, the invention relates to a non-contacting static charge neutralizing devices.

BACKGROUND OF THE INVENTION

It is known to use non-conductive bearings or sleeves in conveyor rollers and other rollers in various process equipment to provide non-corrosive assemblies and to reduce costs for such equipment. A non-conductive bearing is known to be composed of nylon, polyurethane or other synthetics for durability and anti-corrosion properties. Such non-metallic bearings do not require grease or other lubrication and are often preferred for machinery used in food processing equipment, medical supplies production facilities and other installations that require protection from contamination.

A disadvantage from the use of such non-conductive bearings on rollers and shafts is that static charges are generated and stored in the roller or shaft, particularly under high speed operating conditions. The static charges result from the separation of two sliding surfaces that are not conductive and are isolated. Although it is common to form the shaft of metal, a metal shaft will store static charges if the shaft is isolated by non-conductive bearings. When the charge level of the shaft reaches a critical limit, a spark can occur, arcing to conductive components that are nearby. It is known in such installations that the static charge may reach twenty thousand volts, and can destroy critical electronic components near the conveyer roller or shaft, and may shock personnel in close proximity thereto.

Another common occurrence of shaft-induced current is experienced with three-phase motors utilizing variable speed control devices. Static charges can accumulate to a level that overcomes air insulation, approximately 3,000 volts/mm between the shaft and bearing races. An instantaneous burst of electrical energy can occur, draining the high level current to ground. Arcing creates potential danger to persons nearby and can cause damage to nearby components, including sputtering of metal from the bearing races at the point of current flow, thus damaging the bearing.

It is known to provide conductive grounding brushes in contact with a roller or shaft that becomes charged during operation. The brush is electrically grounded, providing a path to ground for a static charge that would other wise build in the roller or shaft. A disadvantage of the use of such discharge brushes is the difficulty of ensuring contact of the fixed position brush with the moving surface of a rotating roller or shaft. The sliding contact between the brush and the rotating shaft or roller also causes significant and relatively rapid wear of the brush, which can generate dust or liberate fibers from the brush. Contamination from such dust or fibers can be detrimental to the process in which the roller or shaft operates.

In electric motors, it is known to use spring-loaded copper brushes to provide a substantially continuous flow of current to ground. While copper brushes work well to control the build-up of static charges, the copper brushes wear out quite rapidly and require frequent service and/or replacement. Copper brushes can allow a burst of energy on power-up because of metal-to-metal contact design.

What is needed in the art is a static neutralizing device for conveyor rolls, motor shafts and the like, that can be used easily to dissipate static charges effectively, and which eliminates intimate contact between the device and the roller or shaft to minimize wear and the need for service or replacement.

SUMMARY OF THE INVENTION

The present invention overcomes the aforementioned problems and difficulties by providing a passive static charge neutralizing device including a brush or brushes of fine fiber filaments, the tips of which are in close proximity to but spaced from the rotating shaft or roller and discharge static charge build-up through ionization of air between the brush tips and the moving surface.

In one aspect thereof, the present invention provides an apparatus having dissipated static electric charge on a moving component thereof. The apparatus has a moving component upon which static electrical charges build during operation of the apparatus. A static charge neutralizing assembly associated with the moving component includes a conductive carrier strip and a plurality of electrically conductive filaments attached to the carrier strip. The filaments have diameters sufficiently small to induce ionization in the presence of an electrical field generated by static charges on the moving component. The filaments are disposed on the carrier strip and extend beyond an edge of the carrier strip. The filaments have distal ends remote from the carrier strip. The apparatus is disposed with respect to the component to hold the filaments with the distal tips adjacent but in spaced relation to the moving component, to thereby cause ionization between the filaments and the moving component.

In another aspect thereof, the present invention provides an electric motor with a motor shaft rotated during operation of the motor and accumulating static charges thereon during the operation. A static charge neutralizing assembly is associated with the shaft. The neutralizing assembly includes a conductive carrier strip and a plurality of electrically conductive filaments electrically connected to the conductive carrier strip. The filaments are sufficiently small to induce ionization in the presence of an electrical field from static charges on the shaft. The filaments project beyond an edge of the carrier strip and having distal tips disposed adjacent but in spaced relation to the shaft.

In still another aspect thereof, the present invention provides a method for neutralizing static charge on a moving component of an apparatus. The method includes of providing an arrangement of filaments having diameters sufficiently small to induce ionization in the presence of an electrical field created by static charges on the component; positioning distal ends of the filaments near but spaced from a surface of the component; operating the apparatus including moving the surface of the component past the distal tips of the filaments adjacent thereto; and inducing ionization from the static electric charge on the surface of the component along the filament distal tips.

An advantage of the present invention is providing a static charge neutralizing device that does not require intimate contact between the device and a rolling surface such as a shaft or roller and therefore is not prone to wear and failure.

Another advantage of the present invention is providing a static charge neutralizing device particularly effective for use on three-phase motor shafts.

Still another advantage of the present invention is providing a static charge neutralizing device that can be used on rollers for food and/or medical component processing in which contamination must be minimized.

A further advantage of the present invention is providing a static charge neutralizing device that effectively reduces charges and eliminates arcing and potential damage to bearing surfaces and the like.

Other features and advantages of the invention will become apparent to those skilled in the art upon review of the following detailed description, claims and drawings in which like numerals are used to designate like features.

BRIEF DESCRIPTION OF THE DRAWINGS

FIG. 1 is a perspective view, partially broken away illustrating application of a non-contacting static neutralizing assembly in accordance with the present invention installed in the interior of a conveyor roll or the like;

Figure 1:
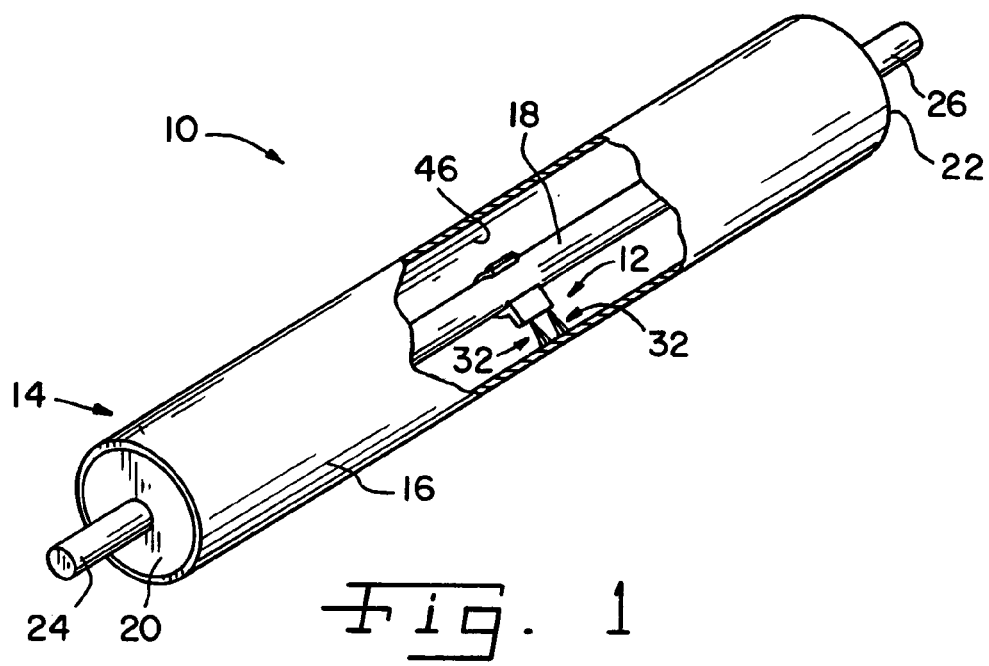

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, a roller assembly 10 is shown, including a static charge neutralizing assembly 12 of the present invention operatively installed on a roller 14 for dissipating the accumulation of static charge on roller 14. In the exemplary embodiment shown, roller 14 is a conveyor roller, but may be another roller type for another purpose.

Roller 14 includes a hollow shell 16 mounted for rotation on a shaft 18. Shell 16 includes ends 20 and 22 mounted by bearings (not shown) or the like on shaft 18, with shaft 18 extending completely through shell 16. End portions 24 and 26 of shaft 18 project outwardly of roller ends 20 and 22, providing structure by which roller 12 can be mounted in equipment or machinery for operation.

Figure 2:
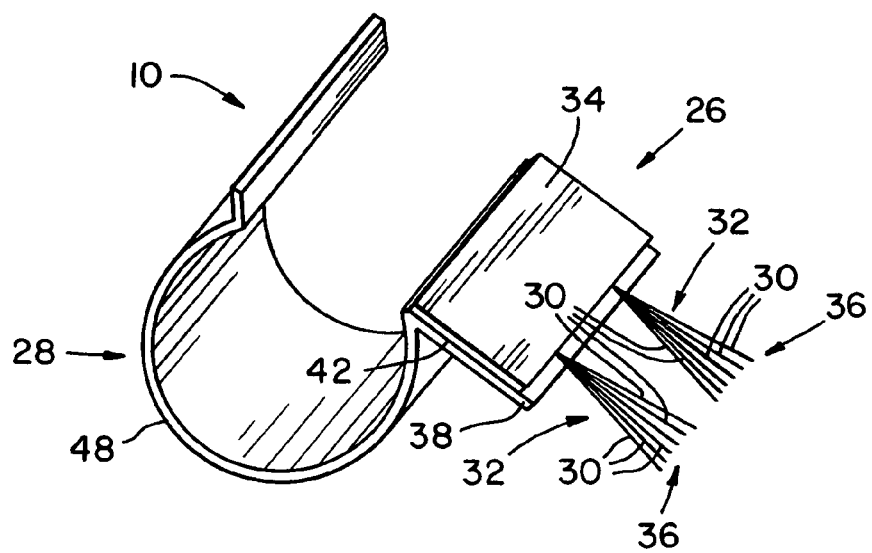
FIG. 2 is an enlarged perspective view of a non-contacting static neutralizing assembly in accordance with the present invention.

Static charge neutralizing assembly 12 is disposed within shell 16 and includes a mounting fixture 28 by which assembly 12 is attached to shaft 18. Neutralizing assembly 12 further includes a brush-like assembly of a plurality of individual fiber filaments 30 that may be arranged individually or in bundles 32, two such bundles 32 shown in FIG. 2. Those skilled in the art will understand readily from the disclosure of the present invention that more or fewer bundles 32 can be used, and that filaments 30 can be arranged also in a substantially continuous row, rather than in bundles 32. Further, for ease in illustration, each bundle 32 is shown to have six or seven filaments 30; however, it should be recognized that in most applications for neutralizing assembly 12 each bundle 32 will have many more filaments 30, and may include fifty or more filaments 30. Those skilled in the art also will understand in view of the current disclosure that although one neutralizing assembly 12 is shown in FIG. 1, roller assembly 10 can include a plurality of neutralizing assemblies 12 disposed along shaft 18.

Each filament 30 is a fine, hair-like structure and can be made from carbon fiber, stainless steel fiber, conductive acrylic fiber or any other conductive fiber-type filament that can be provided with diameters sufficiently small to induce ionization when in the presence of an electrical field. Filaments 30 are adhered directly or indirectly to a carrier strip 34 and to mounting fixture 28 in an electrically conductive connection. Distal tips 36 of filaments 30 extend substantially beyond an edge 38 of carrier strip 34 and mounting fixture 28, and are in uniform spaced relation to carrier strip 34 and mounting fixture 28. Strip 34 is a conductive strip material, and may be a metal foil. Preferably, strip 34 is a non-metallic conductive material, such as conductive plastic, to eliminate potential corrosion. Polycarbonate film is a suitable material for carrier strip 34, and one such polycarbonate marketed under the trade name BAYFOL® is available from Bayer Polymers Division, Bayer Corporation, 100 Bayer Road, Pittsburgh, Pa. 15205-9741. BAYFOL® as a film is an extruded anti-static film made from a blend of polycarbonate and polyester. Carbon black filler is included in the structure to provide anti-static properties.

An adhesive, which can be a double-sided acrylic tape bonds securely to filaments 30 and conductive carrier strip 34 on one side and to mounting fixture 28 on the opposite side. Polyurethane and other adhesive coatings also can be used. Suitable polyurethane for use as an adhesive coating is Minwax® Wipe-On Poly from Minwax Company. Another suitable adhesive is Naycor® 72-9904 acrylic adhesive from National Starch and Chemical Company.

Mounting fixture 28 includes a sleeve 40 that at least partially surrounds shaft 18, and an outwardly extending flange 42 to which filaments 30 and carrier strip 34 are connected. Sleeve 40 is flexible, to allow mounting fixture 28 to be mounted on a variety of different shafts 16, of different diameters. Conductive plastics such as polycarbonate and metals such as aluminum are suitable materials for the construction of mounting fixture 28.

Figure 3:
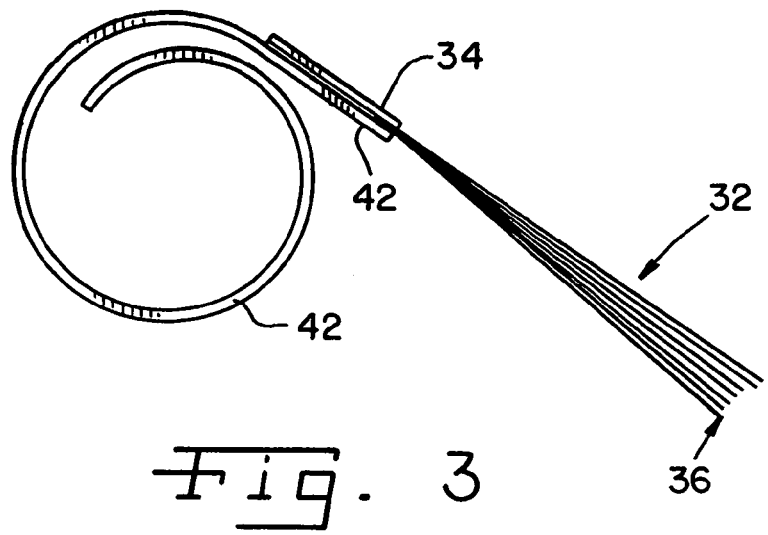
FIG. 3 is an end elevational view of an alternate form of the present invention.

FIG. 3 illustrates another variation of mounting fixture 28, which includes a spring-like coil 44 that can be expanded to accommodate shafts 16 if different diameters.

Mounting fixture 28, and particularly flange 42 thereof is selected and provided in a suitable size, together with a selected length of filaments 30 to place distal tips 36 in uniform spaced relation to an interior surface 46 of shell 16. As a result, as shell 16 rotates and static charge builds thereon, the charge is dissipated by ionization at distal tips 36 of filaments 30. As an electrical field generated by charged surface 46 encounters filaments 30, an ionized field is created, allowing the transfer of charges from charged surface 46 to carrier strip 34 through filaments 30. Generally, spacing of less than about 1 millimeter from static charged surface 46 is required to ensure ionization and discharge of the static charge on surface 46. As a result of the electrically conductive path created by the adhesive between carrier strip 34 and mounting fixture 28, positive and negative charges are conducted to ground through the grounding circuit of the device or equipment in which roller assembly 10 is operated. Even though shell 16 is substantially isolated electrically from the grounding of the machine or equipment in which it operates, static charges generated thereon are discharged to ground.

Once installed properly, since filaments 30 are not in actual contact with shell 16, there is no wear on either shell 16 or neutralizing device 12 from the operation of device 12. Neutralizing device 12 will continue to operate without maintenance or adjustment. There is no wear or resultant generation of dust or contaminants, as with contacting static charge reduction systems.

Figure 4:
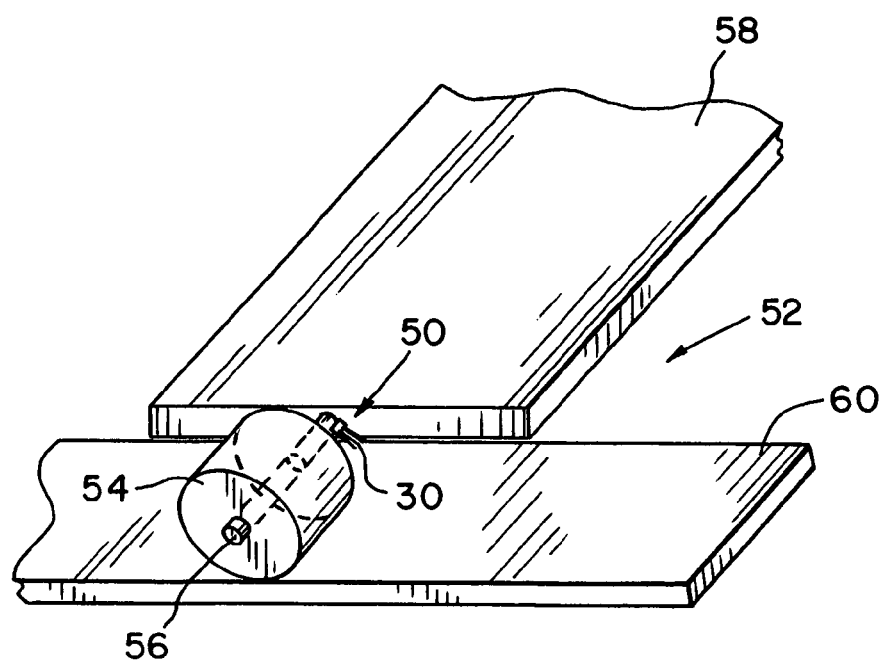
FIG. 4 is a perspective view of an alternate application of a static neutralizing brush assembly in accordance with the present invention.

The present invention has been described thus far herein for installation and operation within a hollow shell 16 of a roller 14. However, the present invention also can be used advantageously in other installations and for other purposes. FIG. 4 illustrates a static charge neutralizing assembly 50 installed for operation within a slat conveyer 52. A non-conductive roller 54 of polyurethane, rubber or the like is mounted on a shaft 56 from a frame number 58. Roller 54 rolls against slats 60, one such slat 60 being shown in FIG. 4. As a result of the non-conductive nature of roller 54, any static charge that accumulates on slats 60 from friction between slots 60 and roller 54 is electrically isolated by non-conductive roller 54. Thus, the charge can continue to build until discharge by sparking or the like to conductive structures nearby.

In accordance with the present invention, neutralizing assembly 50, similar to assembly 12 described previously herein is mounted on shaft 56 in spaced relation to slats 60. As static charges build on slats 60, an electrical field is generated thereby and encounters filaments 30 of neutralizing assembly 50. An ionized field is created, allowing the transfer of charges from slats 60 through neutralizing assembly 50 and shaft 56 to the grounding circuit provided by frame member 58.

Figure 5:
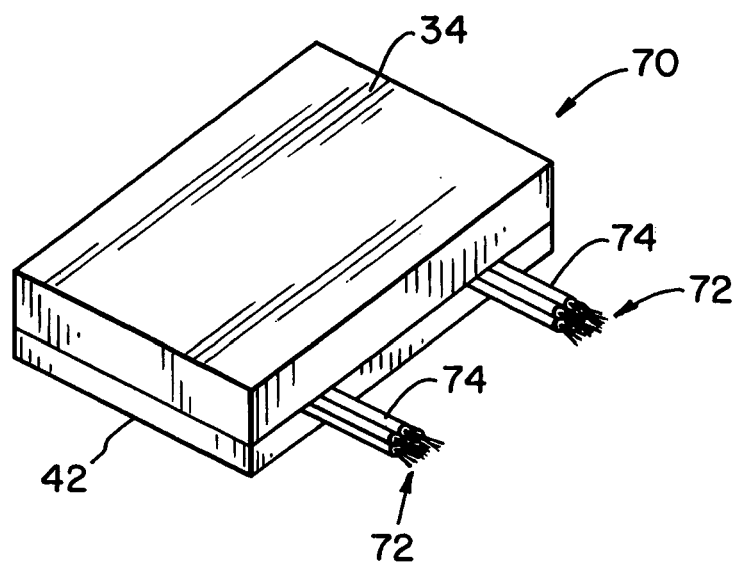
FIG. 5 is an enlarged perspective view of yet another modified form of the present invention.

FIG. 5 illustrates a static charge neutralizing assembly 70 of the present invention, in which only distal tips 72 of the filaments are exposed. Otherwise, any exposed lengths of filaments of the present invention are covered with a coating 74 of PVC or other thermoplastic for protection against a harsh or corrosive environment. The static charge dissipation effect will be retained so long as about 2 millimeters of distal tips 72 are exposed beyond coating 74.

Figure 6:
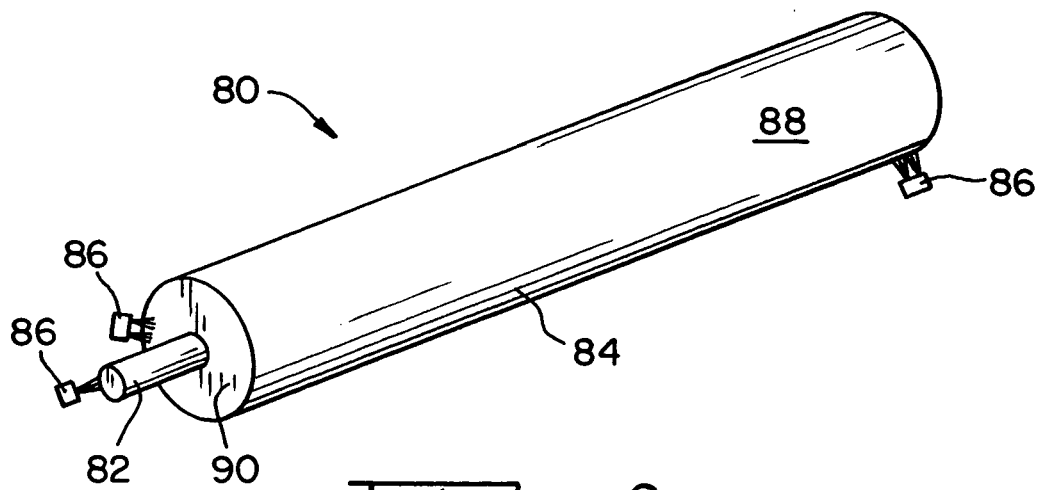
FIG. 6 is a perspective view showing alternate arrangements of the present invention on a roller or conveyor shaft.

FIG. 6 illustrates alternative positions for installation of the present invention on a roller assembly 80. Roller assembly 80 includes a shaft 82 carrying a roller body 84. In some processes and constructions, roller body 84 may be solid or may be otherwise inaccessible. For example, in some processes it is advantageous to use temperature-moderated rolls in which heating or cooling fluids and systems are provided in roller body 84. As mentioned previously, in other applications roller body 84 may be solid. In still further applications of the present invention, roller body 84 may be sufficiently small that the installation of additional equipment therein is impractical. FIG. 6 illustrates that static charge neutralizing assemblies 86 in accordance with the present invention can be installed for operation in conjunction with an outer surface 88 of roller body 84, an end cap 90 of roller body 84 or against shaft 82. While FIG. 6 illustrates charge neutralizing assemblies 86 in each of the aforementioned positions, an assembly or assemblies 86 may be provided in only one or two positions, depending upon static charge dissipation needs of the particular apparatus.

Figure 7:
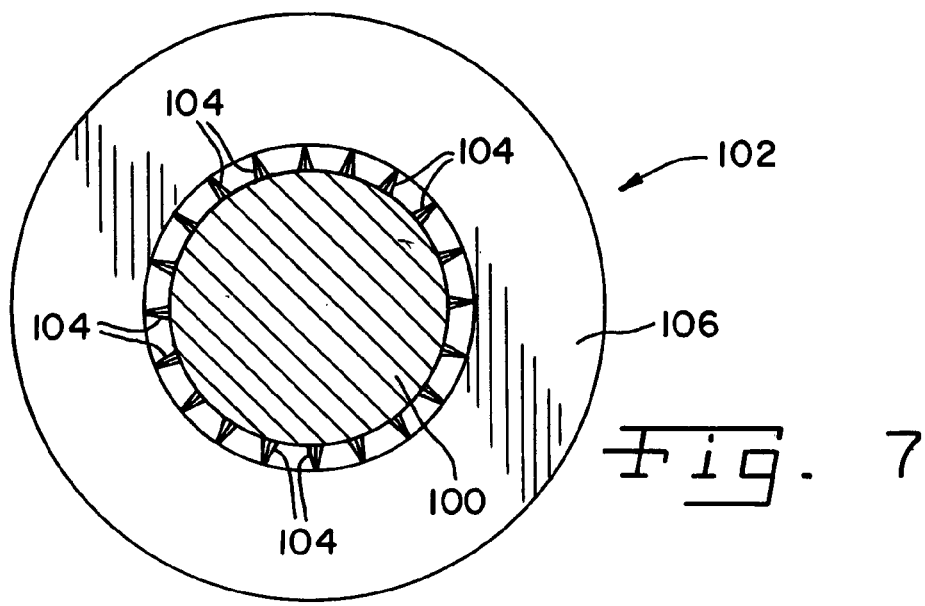
FIG. 7 is a cross sectional view of a shaft having still another modified form of the present invention installed thereon.
Figure 8:
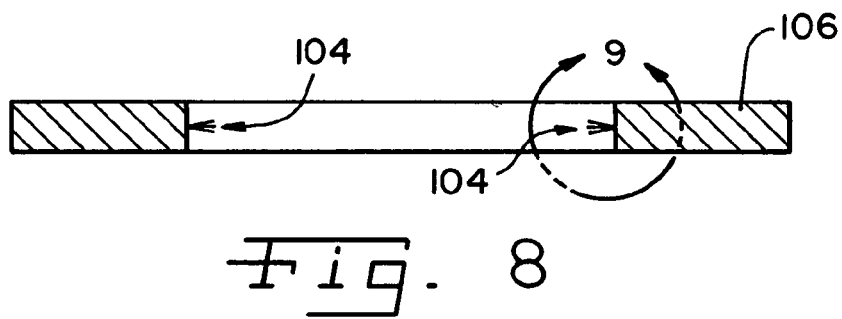
FIG. 8 is a cross sectional view of the embodiment of the invention shown in FIG. 7.

The present invention also is particularly suitable for reducing charges accumulating on a motor shaft. FIG. 7 illustrates a cross-sectional view through a motor shaft 100 having a static charge neutralizing assembly 102 operatively associated therewith. Assembly 102 includes a plurality of filament bundles 104, each including a plurality of individual filaments similar to filaments 30 described previously herein. For purposes of clarity in the drawing, only some bundles 104 are designated with a reference numeral in FIG. 7. Bundles 104 are embedded in a conductive carrier strip 106 that is substantially annularly shaped, with bundles 104 projecting inwardly therein. Carrier strip 106 surrounds shaft 100, with bundles 104 projecting toward and near to, but spaced from the outer rotating surface of motor shaft 100. As static charges accumulate on shaft 100, an ionized field is created around bundles 104, allowing the discharge of static charges from shaft 100 as described previously herein. Neutralizing assembly 102 can maintain the static field on motor shaft 100 at a low level, such as in the range of 300 to 500 volts per millimeter. Any residual charge remaining on shaft 100 is a function of the distance between the tips of bundles 104 and the surface of shaft 100. In this way, electrostatic discharge can be controlled to prevent sputtering of metal from bearing races at the point of current flow and eliminating pitting and fluting caused by sputtered metal. Additionally, the use of neutralizing assembly 102 also minimizes the initial burst of current between the shaft and grounding brushes.

Figure 9:
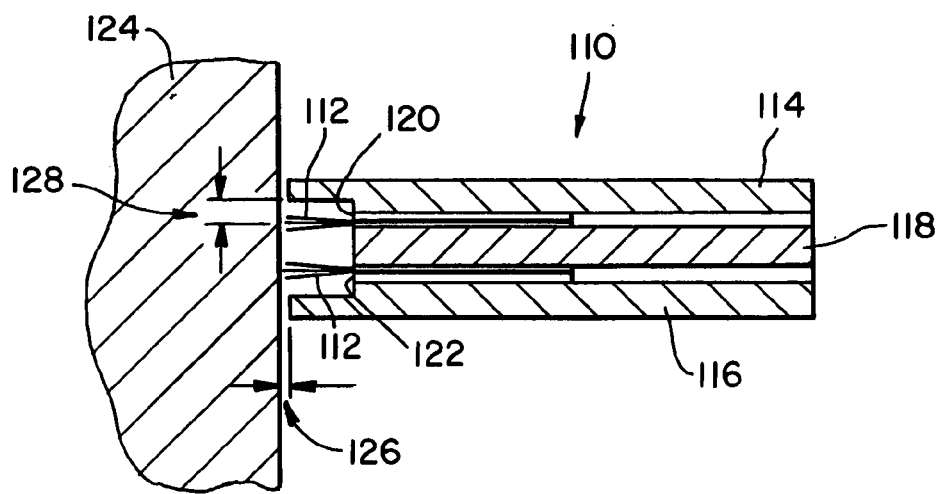
FIG. 9 is an enlarged cross sectional view of yet another modified form of the present invention for a static charge neutralizing assembly.

FIG. 9 illustrates a modified structure in which a static charge neutralizing assembly 110 includes two rows of bundles 112, each containing filaments as described previously herein. Bundles 112 are sandwiched between first and second protective outer layers 114 and 116 and a center conductive carrier strip 118. Outer layers 114 and 116 extend beyond central carrier strip 118, substantially as far as bundles 112 project beyond carrier strip 118. Each outer layer 114 and 116 includes a shoulder 120 and 122, respectively adjacent carrier strip 118, such that distal tips of bundles 112 are spaced not only longitudinally from carrier strip 118 and shoulders 120 and 122, but also laterally from outer layers 114 and 116 adjacent thereto. Ends of bundles 112 are near to but spaced from a charged surface 124. An end gap indicated by reference number 126 in FIG. 9, between bundles 112 and charged surface 124, should be about 1 millimeter. A lateral gap indicated by reference number 128 in FIG. 9, between bundles 112 and outer layers 114 and 116, should be about 2 millimeters. Thus, space is provided completely around bundles 112 to enhance ionization of air around bundles 112 and adjacent charged surface 124. With outer layers 114 and 116 extending adjacent but spaced from bundles 112, bundles 112 are protected from damage or other impairment resulting from inadvertent contact with contaminants or devices in and around the installation.

It will be understood by those skilled in the art that neutralizing assemblies 102 and 110 need not in all circumstances fully surround motor shaft 100. Thus, assemblies 102 and 110 can be semicircular, or surround some other portion of shaft 100 less than the entire surface thereof.

Neutralizing assemblies of the present invention operate in conjunction with, but spaced from moving surfaces of the devices on which the assemblies are installed. Thus, in FIG. 1, assembly 12 operates in spaced relation to moving inner surface 46 of shell 16, and in FIG. 4 neutralizing assembly 50 operates in spaced relation to the moving surface of slats 60. In FIG. 6 neutralizing assemblies 86 operate in spaced relation to rotating outer surface 88, rotating end cap 90 or rotating shaft 82. In FIG. 7 neutralizing devices 104 operate in spaced relation to the moving surface of shaft 100, and in FIG. 9 neutralizing assembly 110 operates in spaced relation to moving surface 124. Thus, problems associated with prior art contacting devices for reducing static charge are eliminated.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An apparatus having dissipated static electric charge on a moving component thereof, said apparatus comprising:
   a moving component upon which static electrical charges build during operation of said apparatus, wherein said moving component is a roll, said roll having a shaft extending therethrough, and said apparatus having a mounting fixture by which a static charge neutralizing assembly is attached to said shaft
   said static charge neutralizing assembly associated with said moving component, said neutralizing assembly including:
      a conductive carrier strip; and
      a plurality of electrically conductive filaments attached to said carrier strip, said filaments having diameters sufficiently small to induce ionization in the presence of an electrical field generated by static charges on said moving component, said filaments disposed on said carrier strip and extending beyond an edge of said carrier strip and having distal ends remote from said carrier strip; and
   said apparatus disposed with respect to said component to hold said filaments with said distal tips adjacent but in spaced relation to said moving component, to thereby cause ionization between said filaments and said moving component.

2. The apparatus of claim 1, said distal tips disposed in spaced relation to an outer surface of said roll.

3. The apparatus of claim 1, said mounting fixture being disposed inside of said roll, and said distal tips of said filaments in spaced relation to an inside surface of said roll.

4. The apparatus of claim 1, said mounting fixture disposed adjacent an end of said roll, with said distal tips in spaced relation to said end of said roll.

5. The apparatus of claim 1, said mounting fixture at least partially surrounding said shaft.

6. The apparatus of claim 1, said moving component being said shaft of said roll.

7. The apparatus of claim 6, said shaft being a motor shaft.

8. An apparatus having dissipated static electric charge on a moving component thereof, said apparatus comprising:
   a moving component upon which static electrical charges build during operation of said apparatus, wherein said moving component is a shaft, and said shaft is a motor shaft;
   a static charge neutralizing assembly associated with said moving component, said neutralizing assembly including:
      a conductive carrier strip;
      a plurality of electrically conductive filaments attached to said carrier strip, said filaments having diameters sufficiently small to induce ionization in the presence of an electrical field generated by static charges on said moving component, said filaments disposed on said carrier strip and extending beyond an edge of said carrier strip and having distal ends remote from said carrier strip; and
      first and second outer layers on opposite sides of said carrier strip, each said outer layer having a shoulder adjacent said carrier strip and having a portion thereof projecting beyond said edge of said carrier strip adjacent but spaced from said distal tips of said filaments; and
   said apparatus disposed with respect to said component to hold said filaments with said distal tips adjacent but in spaced relation to said moving component, to thereby cause ionization between said filaments and said moving component.

9. The apparatus of claim 7, said carrier strip being annular in shape and surrounding said shaft, and said filaments extending inwardly beyond an inner edge of said annular carrier strip.

10. The apparatus of claim 9, said filaments arranged in bundles.

11. An apparatus having dissipated static electric charge on a moving component thereof, said apparatus comprising:
   a moving component upon which static electrical charges build during operation of said apparatus, said moving component being a shaft, and said shaft being a motor shaft;
   a static charge neutralizing assembly associated with said moving component, said neutralizing assembly including:
      a conductive carrier strip, said carrier strip being annular in shape and surrounding said shaft, and said filaments extending inwardly beyond an inner edge of said annular carrier strip;
      a plurality of electrically conductive filaments attached to said carrier strip, said filaments having diameters sufficiently small to induce ionization in the presence of an electrical field generated by static charges on said moving component, said filaments disposed on said carrier strip and extending beyond an edge of said carrier strip and having distal ends remote from said carrier strip; and first and second annular outer layers on opposite sides of said carrier strip, each said outer layer having a shoulder adjacent said carrier strip and having a portion thereof projecting inwardly adjacent but spaced from said distal tips of said filaments; and said apparatus disposed with respect to said component to hold said filaments with said distal tips adjacent but in spaced relation to said moving component, to thereby cause ionization between said filaments and said moving component.

12. The apparatus of claim 11, said filaments arranged in bundles projecting inwardly from said annular shaped carrier strip.

13. The apparatus of claim 1, said filaments arranged in bundles.

14. The apparatus of claim 1, said carrier strip being annular shaped and surrounding said shaft.

15. The apparatus of claim 14, said filaments arranged in bundles projecting inwardly from said annular shaped carrier strip.

16. An electric motor comprising:
  a motor shaft rotated during operation of said motor and accumulating static charges thereon during said operation;
  a static charge neutralizing assembly associated with said shaft, said neutralizing assembly including:
    a conductive carrier strip, said carrier strip being annular shaped and surrounding said shaft;
    a plurality of electrically conductive filaments electrically connected to said conductive carrier strip, said filaments being sufficiently small to induce ionization in the presence of an electrical field from static charges on said shaft, said filaments projecting beyond an edge of said carrier strip and having distal tips disposed adjacent but in spaced relation to said shaft; and
    first and second annular outer layers on opposite sides of said carrier strip, each said outer layer having a shoulder adjacent said carrier strip and having a portion thereof projecting inwardly beyond said edge of said carrier strip adjacent but spaced from said distal tips of said filaments.

17. The motor of claim 16, said filaments arranged in bundles projecting inwardly from said annular shaped carrier strip.

18. The apparatus of claim 1, said filaments arranged in bundles projecting inwardly from said carrier strip.

19. An electric motor comprising:
  a motor shaft rotated during operation of said motor and accumulating static charges thereon during said operation;
  a static charge neutralizing assembly associated with said shalt, said neutralizing assembly including;
    a conductive carrier strip;
    a plurality of electrically conductive filaments electrically connected to said conductive carrier strip, said filaments being sufficiently small to induce ionization in the presence of an electrical field from static charges on said shaft, said filaments projecting beyond an edge of said carrier strip and having distal tips disposed adjacent but in spaced relation to said shaft; and
    first and second outer layers on opposite sides of said carrier strip, each said outer layer having a shoulder adjacent said carrier strip and having a portion thereof projecting inwardly beyond said edge of said carrier strip adjacent but spaced from said distal tips of said filaments.

* * * * *